United States Patent [19]

Takeshita et al.

[11] Patent Number: 5,453,885
[45] Date of Patent: Sep. 26, 1995

[54] APPARATUS FOR CORRECTING TIME BASE ERROR OF VIDEO SIGNAL

[75] Inventors: Hiroshi Takeshita, Ebina; Tsuneo Ubukata, Yokohama, both of Japan

[73] Assignee: Victor Company of Japan, Ltd., Yokohama, Japan

[21] Appl. No.: 295,489

[22] Filed: Aug. 25, 1994

Related U.S. Application Data

[63] Continuation of Ser. No. 41,231, Mar. 31, 1993, abandoned.

[30] Foreign Application Priority Data

Mar. 31, 1992 [JP] Japan ............... 4-105708

[51] Int. Cl.⁶ .......................... H04N 5/956
[52] U.S. Cl. ................. 360/36.2; 360/36.1; 360/51; 358/339; 348/497
[58] Field of Search .......................... 360/36.1, 36.2, 360/37.1, 4.1, 51; 358/319, 320, 338, 339, 148; 348/497

[56] References Cited

U.S. PATENT DOCUMENTS

| | | | |
|---|---|---|---|
| 3,900,885 | 8/1975 | Tallent et al. ................. | 358/8 |
| 4,054,903 | 10/1977 | Ninomiya ..................... | 358/8 |
| 4,054,921 | 10/1977 | Tatami ........................ | 360/36.2 X |
| 4,063,284 | 12/1977 | Tatami ........................ | 358/127 |
| 4,165,524 | 8/1979 | Ninomiya ..................... | 360/36 |
| 4,733,312 | 3/1988 | Morimoto ..................... | 360/10.1 |
| 4,959,825 | 9/1990 | Okano ......................... | 369/48 |
| 4,977,462 | 12/1990 | Takanashi et al. .............. | 360/36.2 X |
| 5,130,858 | 7/1992 | Ebara et al. .................. | 360/36.2 X |
| 5,220,425 | 6/1993 | Enari et al. .................. | 360/36.2 X |

OTHER PUBLICATIONS

Patent Abstracts of Japan, vol. 015, No. 209 (E-1072), May 28, 1991 Aoki Masayuki.
Patent Abstracts of Japan, vol. 008, No. 060 (P-262), Mar. 22, 1984 Harada Shigeru.
Patent Abstracts of Japan, vol. 015, No. 423 (E-1127), Oct. 28, 1991, Fujii Yukio et al.

*Primary Examiner*—Andrew L. Sniezer
*Attorney, Agent, or Firm*—Jacobson, Price, Holman & Stern

[57] ABSTRACT

An apparatus for correcting a time base error of a video signal. Signal portions of the video signal are sequentially written in memories with a write clock signal synchronizing with the video signal at specific write timings and sequentially read from the memories with a read clock signal of a constant frequency at specific read timings. At least one of the read timings are changed so that a correlation among the signal portions sequentially read from the memories remains unchanged when a difference between the write and read timings are smaller than a reference value.

3 Claims, 11 Drawing Sheets

APPARATUS FOR CORRECTING TIME BASE ERROR OF VIDEO SIGNAL

This is a continuation of application Ser. No. 08/041,231, filed Mar. 31, 1993 which was abandoned upon the filing hereof.

BACKGROUND OF THE INVENTION

1. Field of the Invention

The present invention relates to an apparatus for correcting a time base error of a video signal.

2. Description of the Prior Art

It is well known that a video signal reproduced by a video tape recorder (VTR) is more or less fluctuated on the time base (time base error) caused by a reproduction mechanism of the VTR.

There is a conventional time base error correction apparatus for compensating the fluctuation (jitter), which has so-called ring type memories (which will be described later). In the conventional apparatus, reproduced video signals are written in memories with a write clock signal synchronizing with the reproduced video signals and then the written reproduced video signals are read from the memories with a read clock signal of a constant frequency.

However, there are disadvantages in the conventional apparatus as follows. Firstly, in the case where a frequency of the write clock signal is higher than that of the read clock signal, a write timing may catch up with and get ahead a read timing. Secondly, in the case where a frequency of the read clock signal is higher than that of the write clock signal, the read timing may catch up with and get ahead the write timing.

The disadvantages will be explained in detail with FIGS. 1(a) to 1(c). In each drawing, an inner part M of a circle depicts a memory area in or from which reproduced video signals are written or read.

Figure 1A:
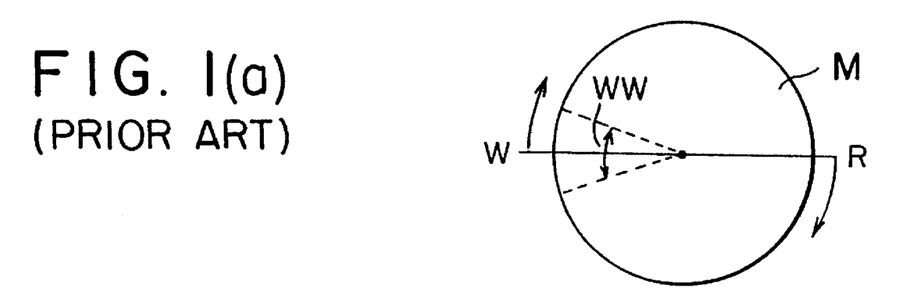
FIGS. 1(a) to 1(c) is a view explaining the disadvantage of a conventional time base error correction apparatus.

FIG. 1(a) shows a usual relationship between a write timing W and a read timing R. As shown, both timings are separated far from each other on the time base. The write timing W may be fluctuated within a period WW, because the write clock signal synchronizes with the reproduced video signals. This write timing is, however, separated far away from the read timing, thus inducing no problem.

Figure 1B:
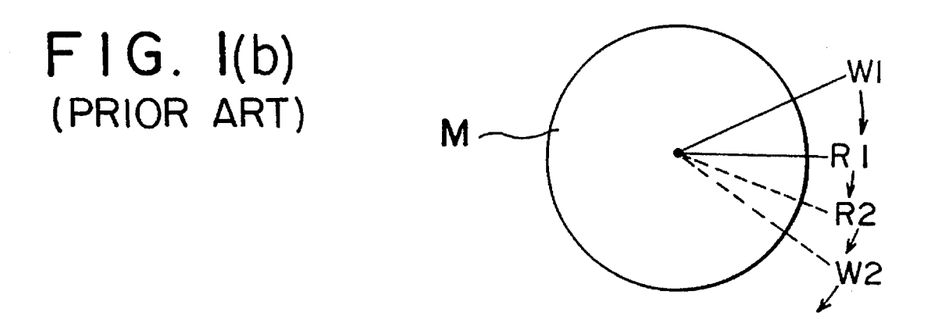

FIG. 1(b) shows the case where the frequency of the write clock signal is higher than that of the read clock signal, so that the write timing W catches up with and gets ahead the read timing R. As shown, a write timing W1 gradually goes near a read timing R1 and finally a write timing W2 catches up with and gets ahead a read timing R2. Accordingly, before a first reproduced video signal is read from a part of the memory area M, the next second reproduced video signal will be written in the same part. This results in that the first reproduced video signal cannot be read from the memory area, so that the number of horizontal scanning lines corresponding to the first reproduced video signal per field will decrease.

Figure 1C:
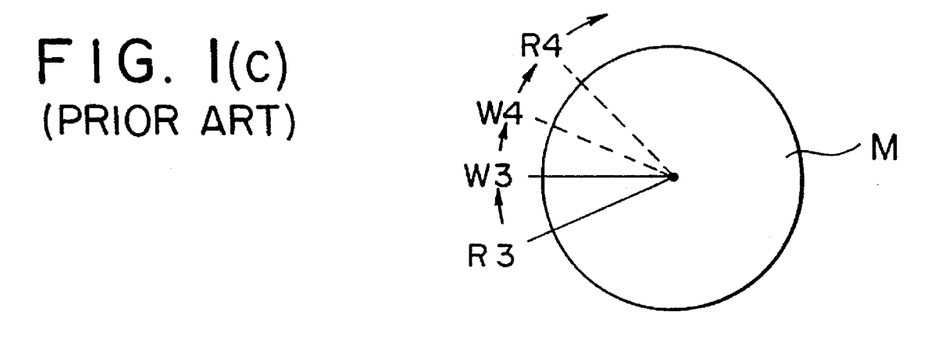

Contrary to this, FIG. 1(c) shows the case where the frequency of the read clock signal is higher than that of the write clock signal, so that the read timing R catches up with and gets ahead the write timing W. As shown, a read timing R3 gradually goes near a write timing W3 and finally a read timing R4 catches up with and gets ahead a write timing W4. Accordingly, a reproduced video signal which has already been read from a part of the memory area M is again read from the same part. This results in that the number of horizontal scanning lines corresponding to that twice reproduced video signal per field will increase.

Accordingly, when the number of horizontal scanning lines per field increases or decreases after a vertical synchronizing signal, as described above, vertical synchronization on a screen will be disturbed in a period of time before the next coming vertical synchronizing signal, thus the picture quality on the screen will be remarkably deteriorated.

SUMMARY OF THE INVENTION

Accordingly, the object of the present invention is to provide an apparatus for correcting a time base error of a video signal by which the timing for compensating the time base error is changed so that vertical synchronization is not disturbed.

According to the invention, the apparatus for correcting a time base error of a video signal comprises: a plurality of memories for storing signal portions, each of the signal portion corresponding to a horizontal scanning line of the video signal; means for sequentially writing the signal portions in the memories with a write clock signal synchronizing with the video signal at specific write timings and sequentially reading the signal portions thus written from the memories with a read clock signal of a constant frequency at specific read timings; and means for detecting a difference between the write and read timings and, when the difference is smaller than a reference value, changing at least one of the read timings so that a correlation among the signal portions sequentially read from the memories remains unchanged.

According to the invention, the apparatus further comprises: means for ORing the changed read timings with each other to generate an OR signal; means, responsive to the read clock signal and the OR signal, being rest by the OR signal to start counting the read clock signal of the constant frequency, thus to generate an equalizing pulse signal, a vertical synchronizing signal and a horizontal synchronizing signal, each having a constant frequency; means, responsive to the OR signal, the equalizing pulse signal and the vertical and horizontal synchronizing signals, for selectively outputting the equalizing pulse signal and the vertical and horizontal synchronizing signals in accordance with the changed read timings and composing the selectively outputted signals with each other, thus to generate a composite synchronizing signal; and means for substituting the generated composite synchronizing signal for a synchronizing signal included in the signal portions read from the memories at the changed read timings.

BRIEF DESCRIPTION OF THE DRAWINGS

FIG. 1 comprising

FIG. 3 comprising FIGS. 3(a) to 3(p) is a time chart explaining an usual operation of the apparatus shown in FIG. 2;

FIG. 7 comprising FIGS. 7(a) to 7(h) is a time chart explaining MEMORY JUMP;

FIG. 8 comprising FIGS. 8(a) to 8(h) is a time chart explaining MEMORY JUMP;

FIG. 10 comprising FIGS. 10(a) to 10(f) is a time chart explaining the operation of the MEMORY JUMP circuit 7 of FIG. 9;

FIG. 12 comprising FIGS. 12(a) to 12(g) is a time chart explaining a usual operation of the synchronizing signal generating circuit 10 of FIG. 11;

FIG. 13 comprising FIGS. 13(a) to 13(f) is a time chart explaining an operation of the synchronizing signal generating circuit 10 of FIG. 11 when MEMORY JUMP is executed.

DETAILED DESCRIPTION OF THE PREFERRED EMBODIMENTS

Embodiments of the apparatus for correcting a time base error of a reproduced video signal according to the present invention will be described in detail hereinbelow with reference to the attached drawings.

There are four memories for storing signal portions of a reproduced video signal provided in the embodiments. And, after a first signal portion written in the first memory is read therefrom, for example, a second signal portion written in the second memory and having correlation with the first signal is twice read from the second memory or a third signal portion written in the third memory and having correlation with the first signal portion is read from the third memory without reading the second signal portion, when there is a possibility that read and write timings are close to each other and will be reversed. This function is called "MEMORY JUMP" hereinafter.

More in detail, MEMORY JUMP is executed before a vertical synchronizing signal and the information which expresses the execution of MEMORY JUMP is applied to a synchronizing signal generating circuit (which will be described later) to generate a synchronizing signal in accordance with an increase or a decrease in the number of horizontal scanning lines per field.

Figure 2:
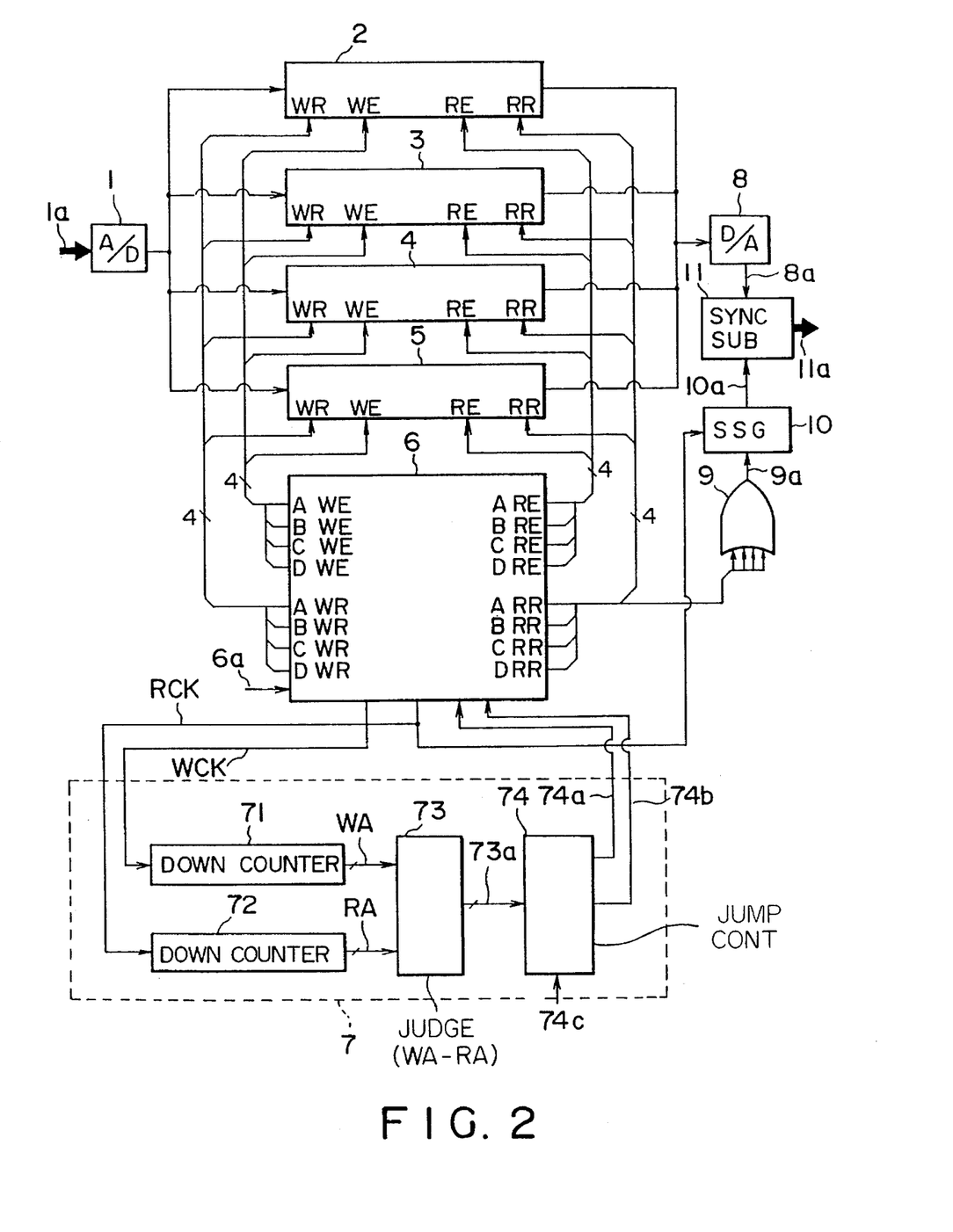
FIG. 2 is a block diagram of a preferred embodiment of the apparatus according to the present invention.

In FIG. 2, signal portions of an analog reproduced video signal 1a, each signal portion corresponding to one horizontal scanning line, are sequentially applied to an analog-to-digital convertor (A/D) 1.

The output digital signal portions of the analog-to-digital convertor 1 are then sequentially applied to memories 2 to 5 whose read and write timings are controlled by a memory control circuit 6. The memories 2 to 5 are connected to the memory control circuit 6 so that the memories are arranged into the ring type memories.

A horizontal synchronizing signal 6a is separated from the reproduced video signal 1a by a known horizontal synchronizing signal separation circuit (not shown) and applied to a known PLL circuit (not shown) included in the memory control circuit 6 to generate a write clock signal WCK. Thus, the write clock signal WCK is synchronizing with the reproduced video signal 1a. The digital signal portions of the reproduced video signal 1a are then written in the memories 2 to 5 with the write clock signal WCK. And the written digital signal portions of the reproduced video signal 1a are read from the memories 2 to 5 with a read clock signal RCK of a constant frequency which is generated by a known clock signal generation circuit (not shown) included in the memory control circuit 6.

The digital signal portions read from the memories are then sequentially applied to a digital-to-analog convertor (D/A) 8 which converts the digital signal portions into analog signals portions to output an analog reproduced video signal 8a. The reproduced video signal 8a is applied to a synchronizing signal substituting circuit (SYNC SUB) 11. Also applied to the circuit 11 is a synchronizing signal 10a composed of horizontal and vertical synchronizing signals generated by a synchronizing signal generating circuit (SSG) 10. The synchronizing signal substituting circuit 11 substitutes the synchronizing signal 10a for a synchronizing signal composed of horizontal and vertical synchronizing signals and included in the reproduced video signal 8a to output a video signal 11a which is applied to a transmission line (not shown).

A MEMORY JUMP circuit 7 provided in the apparatus of FIG. 2 is to generate MEMORY JUMP control signals which are applied to the memory control circuit 6 to execute MEMORY JUMP within a specific term on the time base before a vertical synchronizing signal for preventing disturbance of vertical synchronization on a screen. An OR gate 9 also provided in the apparatus of FIG. 2 is to apply a reset signal 9a to the synchronizing signal generating circuit 10 to which the read clock signal RCK is also applied, to generate the synchronizing signal 10a.

Figure 3:
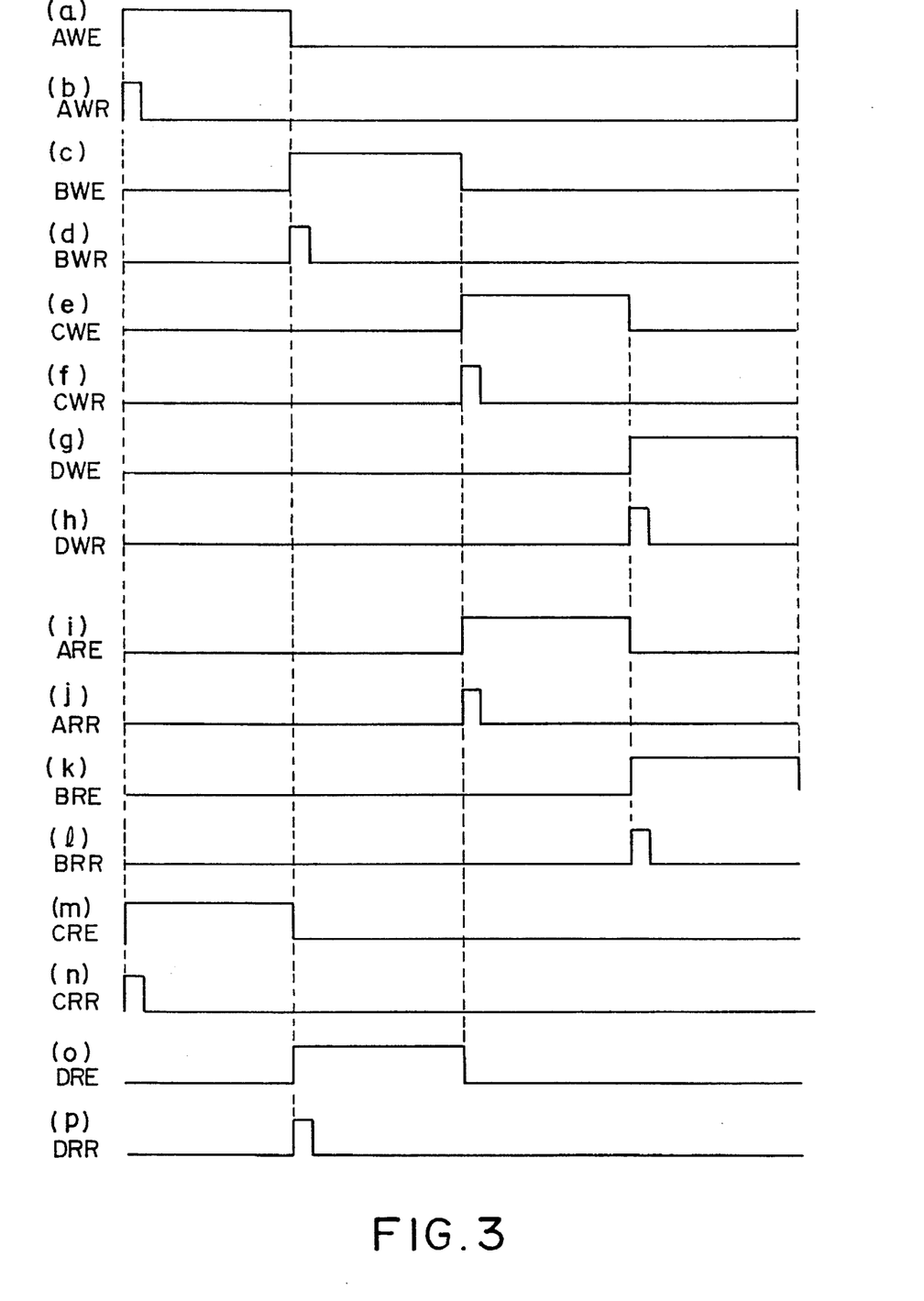

A usual operation of the apparatus shown in FIG. 2 will be explained with reference to FIG. 3 before explaining the operation of each of the MEMORY JUMP circuit 7, OR gate 9, the synchronizing signal generating circuit 10 and synchronizing signal substituting circuit 11.

FIGS. 3(a), 3(c), 3(e) and 3(g) respectively show write enable signals AWE, BWE, CWE and DWE. And the signals AWE, BWE, CWE and DWE are applied from the memory control circuit 6 to the memories 2 to 5, respectively. The memories 2 to 5 become in the write enable status while the potential of the signals AWE, BWE, CWE and DWE are being HIGH level, respectively. Hereinafter, it is simply stated that the signal is "HIGH level" or "LOW level" when the potential of a signal is HIGH or LOW level.

Furthermore, FIGS. 3(b), 3(d), 3(f) and 3(h) respectively show write reset signals AWR, BWR, CWR and DWR. And the signals AWR, BWR, CWR and DWR are also applied from the memory control circuit 6 to the memories 2 to 5, respectively. The signals AWR, BWR, CWR and DWR become HIGH level synchronizing with the leading edge of the signals AWE, BWE, CWE and DWE, respectively and then become LOW level after a specific period of time. Write addresses of the memories 2 to 5 are therefore reset at the initial status synchronizing with the leading edge of the signals AWR, BWR, CWR and DWR, respectively.

The digital signal portions of the reproduced video signal 1a are therefore sequentially written in the memories from 2 to 5 with the write reset and write enable signals.

Next, FIGS. 3(i), 3(k), 3(m) and 3(o) respectively show read enable signals ARE, BRE, CRE and DRE. The signals ARE, BRE, CRE and DRE are applied from the memory control circuit 6 to the memories 2 to 5, respectively. The memories 2 to 5 become in the read enable status while the signals ARE, BRE, CRE and DRE are being HIGH level, respectively.

Furthermore, FIGS. 3(j), 3(l), 3(n) and 3(p) respectively show read reset signals ARR, BRR, CRR and DRR. The signals ARR, BRR, CRR and DRR are also applied from the memory control circuit 6 to the memories 2 to 5, respectively. The signals ARR, BRR, CRR and DRR become HIGH level synchronizing with the leading edge of the signals ARE, BRE, CRE and DRE, respectively and then become LOW level after a specific period of time. Write addresses of the memories 2 to 5 are therefore reset at the initial status synchronizing with the leading edge of the signals ARR, BRR, CRR and DRR, respectively.

The digital signal portions of the reproduced video signal 1a thus written in the memories 2 to 5 are therefore sequentially read from the memories 2 to 5 with the read reset and read enable signals.

As shown in FIGS. 3(a) and 3(m), for example, the write start timing for the memory 2 and the read start timing for the memory 4 are the same with each other. This means that, in the apparatus of FIG. 2, there is a margin of a period of time for the read and write timings, which corresponds to the capacity of two among the memories 2 to 5.

The MEMORY JUMP circuit 7 of FIG. 2 will be explained. The write clock signal WCK and the read clock signal RCK are applied to down counters 71 and 72, respectively. The counters 71 and 72 down-count the number of pulses of the clock signals WCK and RCK from a specific maximum value (reset value) to obtain a write address WA and a read address RA, respectively.

The write and read addresses WA and RA are applied to a judging circuit (JUDGE) 73 by which the read address RA is subtracted from the write address WA to generate judging data 73a.

The judging data 73a is then applied to a JUMP control circuit (JUMP CONT) 74. Also applied to the circuit 74 is a synchronizing signal 74c composed of vertical and horizontal synchronizing signals and separated from the reproduced video signal 1a by a known synchronizing signal separation circuit (not shown). By means of the judging data 73a and the synchronizing signal 74c, the JUMP control circuit 74 examines on whether or not to allow the memory control circuit 6 to execute MEMORY JUMP.

Figure 5:
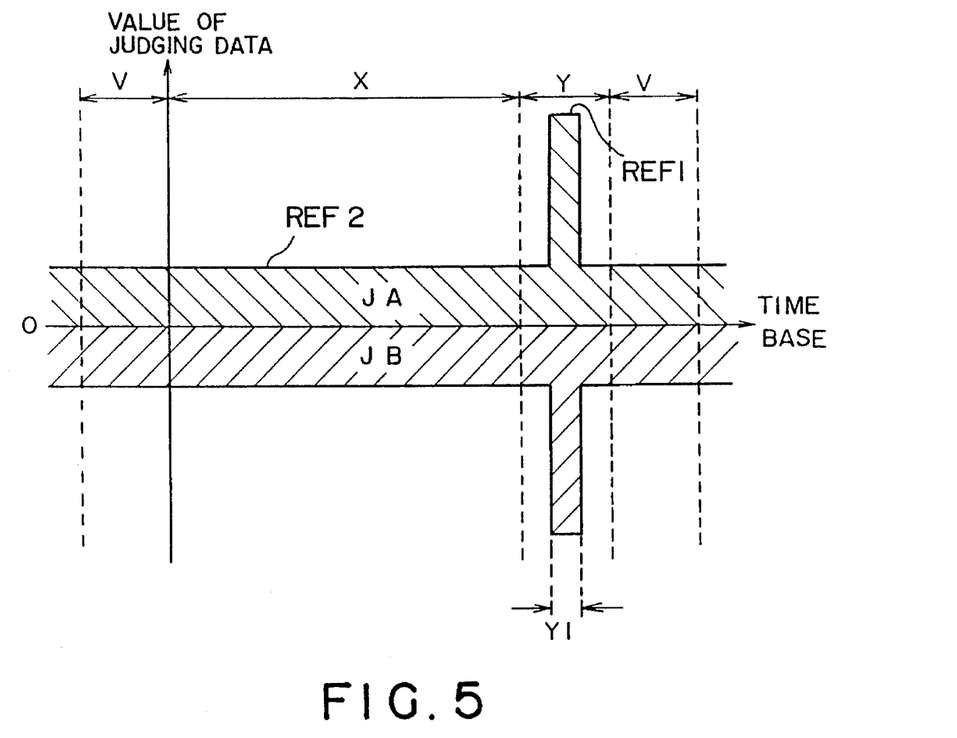
FIG. 5 is a view explaining the operation of the MEMORY JUMP circuit 7 of FIG. 4.

The conceptual function of the JUMP control circuit 74 will be explained with reference to FIG. 5o The axis of abscissas of FIG. 5 is the time base on which "V" depicts a duration of vertical synchronizing signal, "X" a term during which an image corresponding to the reproduced video signal 1a can be effectively displayed on a screen, and "Y" a term during which such an image cannot be displayed. The axis of the ordinates is the value of the judging data 73a, that is, the difference between the write address WA and the read address RA. When the value of the judging data 73a falls within the hatched area JA, where the write address WA is approaching and apt to get ahead of the read address RA, the JUMP control circuit 74 outputs a MEMORY JUMP control signal 74a. Whereas, when the value of the judging data 73a falls within the hatched area JB, where the read address RA is approaching and apt to get ahead of the write address WA, the JUMP control circuit 74 outputs a MEMORY JUMP control signal 74b. Reference values REF1 and REF2 defining the hatched areas JA and JB are so determined that the former is quite larger than the latter, and hence the MEMORY JUMP, if required, is more liable to occur during a term Y1 in the term Y than during the rest.

Figure 4:
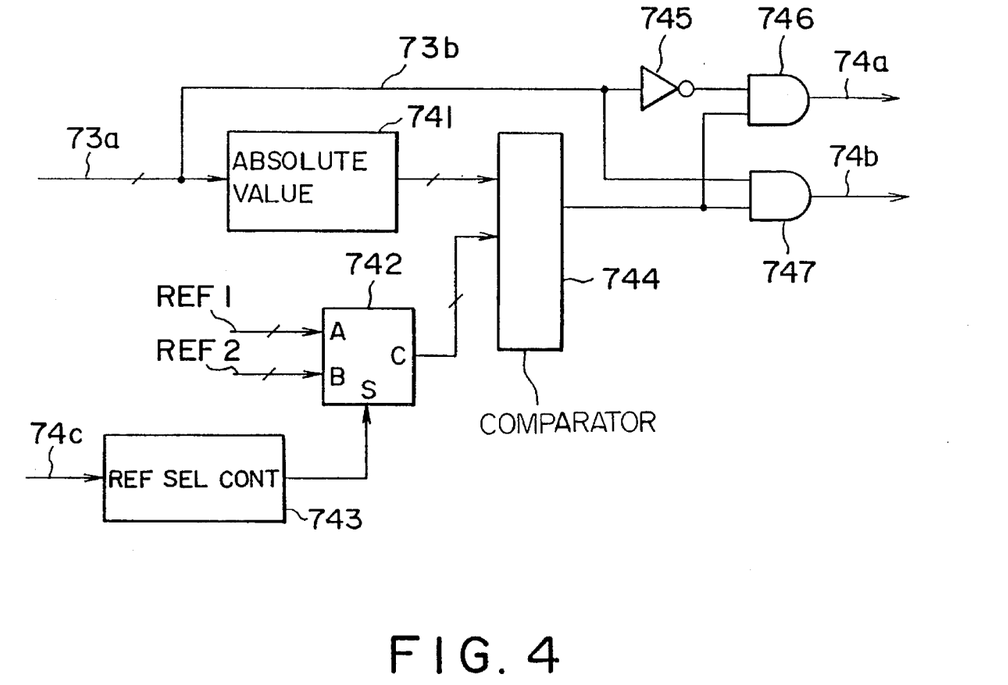
FIG. 4 is a block diagram of a preferred embodiment of the MEMORY JUMP circuit 7 shown in FIG. 2.

A preferred embodiment of the memory control circuit 74 will be explained with reference to FIG. 4. In FIG. 4, the judging data 73a generated by the judging circuit 3 of FIG. 2 is applied to an absolute value circuit (ABSOLUTE VALUE) 741 which generates data 741a expressing the absolute value of the judging data 73a and applies the data 741a to a comparator 744.

Reference data 742a applied from a switching circuit 742 (which will be described later) is also applied to the comparator 744 to compare the data 741a and 742a with each other. In the case where the absolute value data 741a is smaller than the reference data 742a, this case means that the write and read addresses WA and RA are close to each other, so that MEMORY JUMP is required. The comparator 744 thus generates a signal of HIGH level. On the contrary, in the case where the absolute value data 741a is greater than the reference data 742a, this case expresses that the write and read addresses WA and RA are separated away, so that MEMORY JUMP is not required. The comparator 744 thus generates a signal of LOW level.

In FIG. 4, the synchronizing signal 74c is applied to a reference signal selection control circuit (REF SEL CONT) 743. The circuit 743 generates a selection control signal 743a which becomes HIGH level during the term Y1 of FIG. 5, whereas becomes LOW level except the term Y1. The reference signal selection control circuit 743 can be easily organized with a known vertical/horizontal synchronizing signal separation circuit, a counter and a decoder. Thus, indication of the circuit diagram and explanation of the operation of the circuit 743 is omitted here.

To the switching circuit 742, the reference data REF1 and the reference data REF2 smaller than the data REF1 are applied from a known signal generator (not shown). Also applied to the switching circuit 742 is the selection control signal 743a. The switching circuit 742 outputs the reference data REF1 while the signal 743a is kept in HIGH level or during the term Y1, whereas outputs the reference data REF2 while the signal 743a is kept in LOW level or during the terms except the term Y1.

The output reference data REF1 or REF2 is applied to the comparator 744 and is compared to the absolute value data 741a. As described above, when the absolute value data 741a is smaller than the reference data REF1 or REF2, the comparator 744 generates a comparison signal 744a of HIGH level. This indicates that the write and read addresses WA and RA are close to each other, so that MEMORY JUMP is required.

The comparison signal 744a is applied to AND gates 746 and 747. Furthermore, a polarity signal 73b which indicates the polarity of the judging signal 73a is applied to an inverter 745 and the AND gate 747. Throughout the drawings, connection lines with a slant bar indicate that there is data composed of a specific plurality of bits. So, the judging data 73a is composed of the plurality of bits and the most significant bit of the bits is separated from the data 173a as the polarity signal 73b.

When the write address WA is greater than the read address RA and these addresses are close to each other (the area JA of FIG. 5), the polarity signal 73b of LOW level in potential is inverted to HIGH level and is applied to the AND gate 746. As described above, the comparison signal 744a of HIGH level is also applied to the AND gate 746 which then generates a MEMORY JUMP control signal 74a so as not to allow the write timing to catch up with and go ahead the read timing.

On the other hand, when the read address RA is greater than the write address WA (the area JB of FIG. 5), the polarity signal 73b and the comparison signal 744a, both in HIGH level, are applied to the AND gate 747 so as not to allow the read timing to catch up with and get ahead the write timing.

It is assumed that the reference data REF2 is outputted from the switching circuit 742. As shown in FIG. 5, the reference data REF2 is much smaller than the reference data REF1, so that it is also smaller than the absolute value data 741a. Thus, most cases, the comparator 744 generates the comparison signal 744a of LOW level and then the AND gates 746 and 747 do not generate the MEMORY JUMP command signals.

In FIG. 5, the reason why the reference data REF 1 is generated during the term Y1 before the term V for the vertical synchronizing signal so as to have strong possibility of executing MEMORY JUMP is that the disturbance of vertical synchronization due to MEMORY JUMP does not affect the image on the screen. On the contrary, the reason why the reference data REF 2 which is quite smaller than the reference data REF1 is generated during the terms except the term V so as to have weak possibility of executing MEMORY JUMP is that the disturbance of vertical synchronization due to MEMORY JUMP will affect the image on the screen.

However, it is a matter of course that reference data REF2 of larger value can be generated during the term V when the present invention is applied to a television in which vertical synchronization is made after the vertical blanking period.

MEMORY JUMP execution will be explained with reference to FIGS. 6 to 8. The memory control circuit 6 of FIG. 2 is provided with a four-line counter 61 and a decoder 62 shown in FIG. 6.

The read clock signal RCK generated in the memory control circuit 6 is applied to the four-line counter 61 which counts the number of pulses of the signal RCK corresponding to four horizontal scanning lines. The output count data of the four-line counter 61 is applied to the decoder 62 which then generates the read enable signals ARE, BRE, CRE and DRE and the read reset signals ARR, BRR, CRR and DRR.

The MEMORY JUMP control signal 74a or 74b generated by the MEMORY JUMP control circuit 74 is further applied to the four-line counter 61 to increase or decrease the count data to the data corresponding to one horizontal scanning line. The read enable signals ARE, BRE, CRE and DRE and the read reset signals ARR, BRR, CRR and DRR are thus shifted in phase forward or backward on the time axis corresponding to the one horizontal scanning line to execute MEMORY JUMP.

Figure 7:
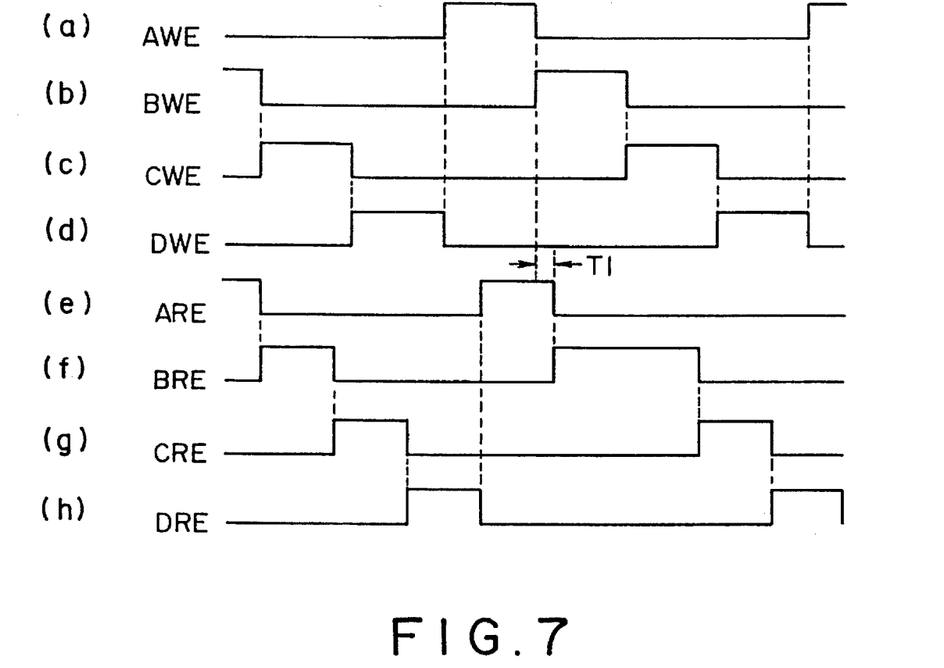

When a period of time T1 shown in FIG. 7 between the trailing edge of the write enable signal AWE for the memory 2 shown in FIG. 7(a) and the trailing edge of the read enable signal ARE for the memory 2 shown in FIG. 7(e) is very short, this might lead to a strong possibility that the write timing will catch up with and go ahead the read timing.

In this case, the write address WA and the read address RA become close to each other. As described before, the difference of the addresses is detected by the MEMORY JUMP circuit 7 and which generates the MEMORY JUMP control signal 74a. Accordingly, as shown in FIG. 7(f), the term for the read enable signal BRE for the memory 3 in HIGH level becomes two times longer than a usual term for the same signal in HIGH level. The digital portion of the reproduced video signal 1a written in the memory 3 is therefore repeatedly read therefrom two times. This results in the number of the horizontal scanning lines increasing one.

Figure 8:
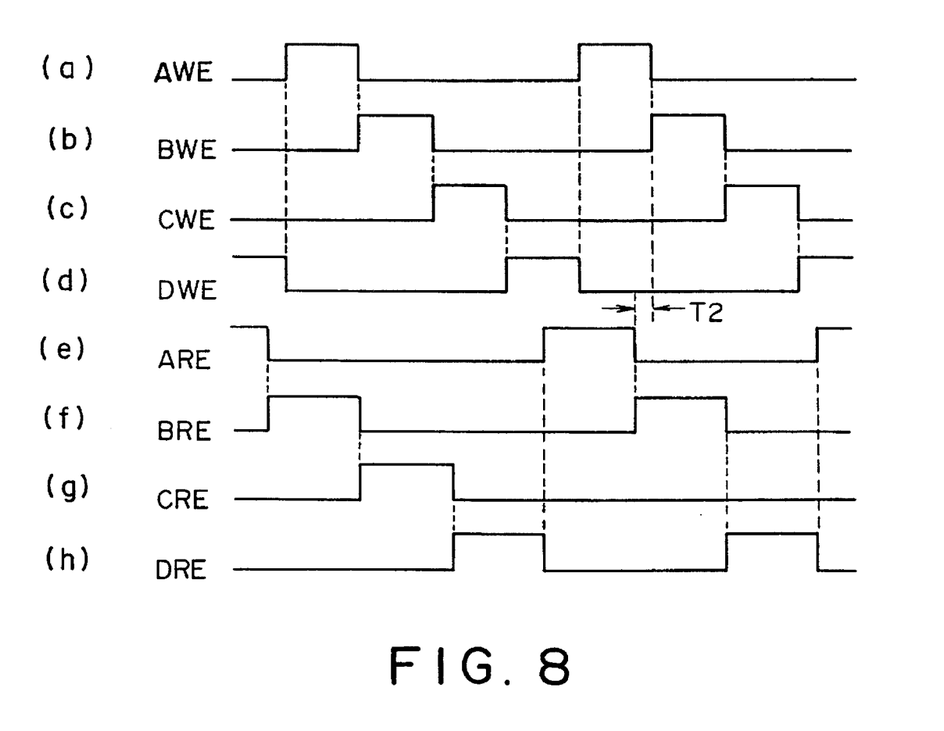

Next, when a period of time T2 shown in FIG. 8 between the trailing edge of the read enable signal ARE for the memory 2 shown in FIG. 7(e) and the leading edge of the write enable signal BRE for the memory 3 shown in FIG. 7(b) is very short, this might lead to a strong possibility that the read timing will catch up with and get ahead the write timing.

Also, in this case, the write address WA and the read address RA become close to each other. As described before, the difference of the addresses is detected by the MEMORY JUMP circuit 7 and which generates the MEMORY JUMP control signal 74b. Accordingly, as shown in FIG. 8(g), the term for the read enable signal CRE for the memory 4 in HIGH level is canceled one time. Therefore, the digital portion of the reproduced video signal 1a written in the memory 4 is not read therefrom one time and that written in the memory 5 is read therefrom after the digital portion written in the memory 3 is read therefrom. This results in the number of the horizontal scanning lines decreasing one.

MEMORY JUMP can be executed as describe above, and it is executed within the term Y1 before the therm V for the vertical synchronizing signal as shown in FIG. 5 so that the disturbance of the vertical synchronization cannot be recognized on the screen.

Another preferred embodiment of the MEMORY JUMP circuit 7 of FIG. 2 will be explained with reference to FIGS. 9 and 10.

Figure 9:
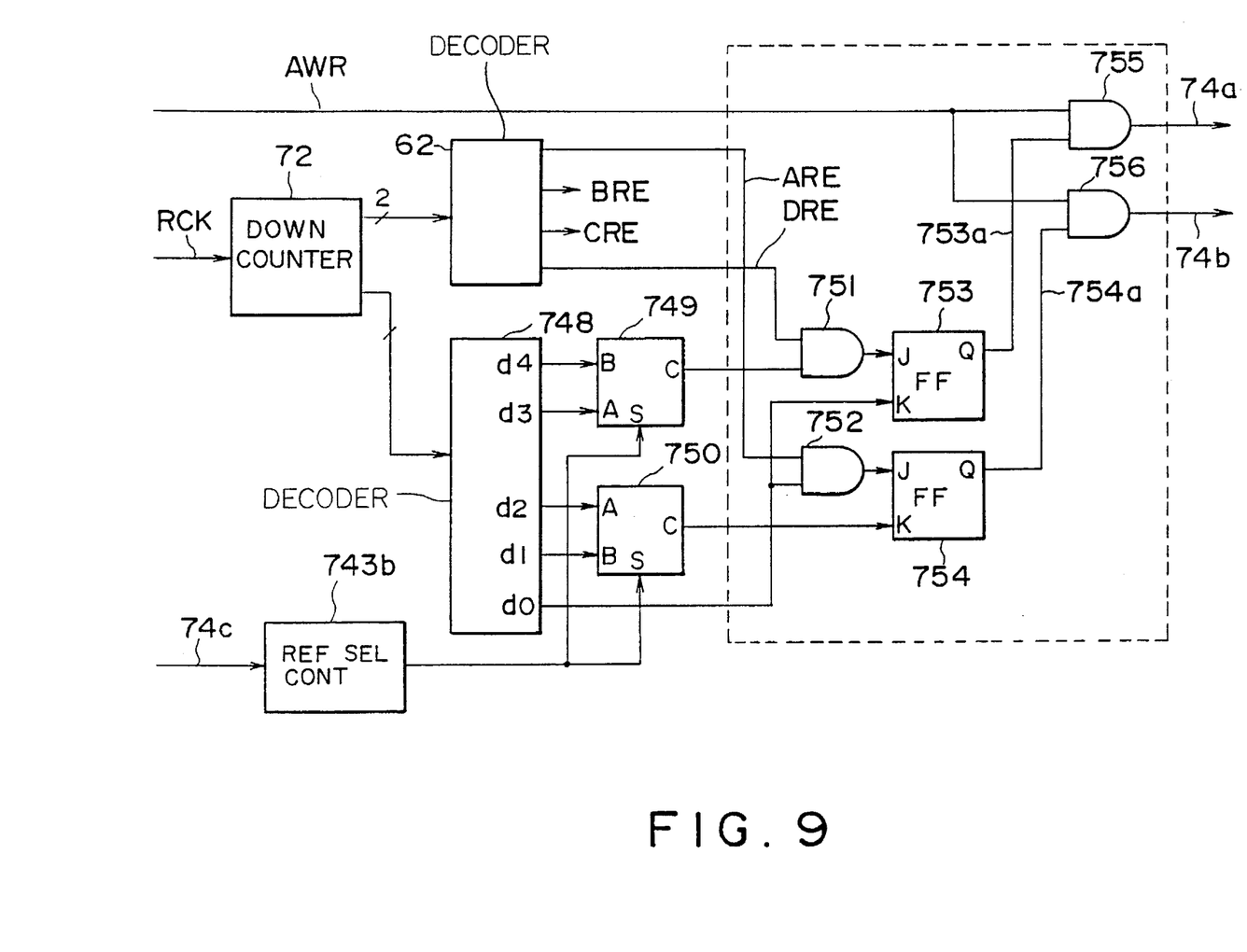
FIG. 9 is a block diagram of another preferred embodiment of the MEMORY JUMP circuit 7 shown in FIG. 2.
Figure 10:
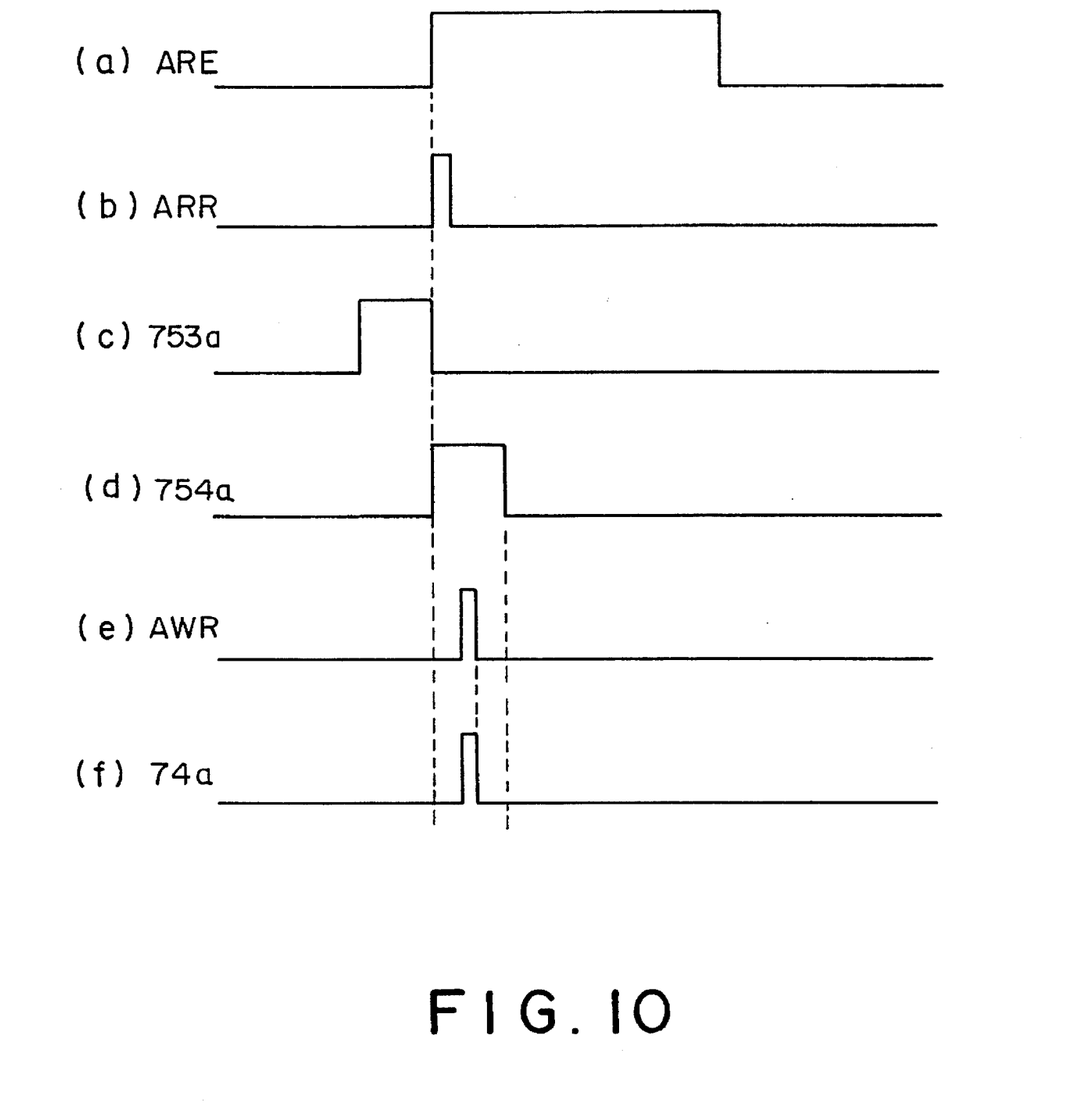

The area depicted by doted lines in the circuit configuration shown in FIG. 9 is only for controlling the read and write timings for the memory 2. The circuit configurations for controlling such timings for the memories 3 to 5 are the same as shown in FIG. 9, so that their illustrations are omitted.

In FIG. 9, the read address RA outputted from the down counter 72 of FIG. 2 is applied to a decoder 748 which generates HIGH level signals at its terminals d0 to d4 in accordance with the value of the read address RA.

The HIGH level signal is appeared at each terminal according to the following conditions:

d0: when the value of the read address RA becomes its maximum by resetting the down counter 72;

d1: when the value of the read address RA becomes the value corresponding to the term for a window signal 754a in HIGH level (which will be described later) shown in FIG. 10(d) and which is a specific short period of time t1;

d2: when the value of the read address RA becomes the value corresponding to the term for the window signal 754a in HIGH level (which will be described later) and which is a specific long period of time t2;

d3: when the value of the read address RA becomes the value corresponding to the term which is obtained by subtracting the term t2 from a term t3 which corresponds to one horizontal scanning line; and d4: when the value of the read address RA becomes the value corresponding to the term which is obtained by subtracting the term t1 from the term t3.

Under the conditions, the output signals at the terminal d3 and d4 of the decoder 748 are applied to a switching circuit 749. Furthermore, the output signals at the terminal d1 and d2 of the decoder 748 are applied to a switching circuit 750.

The switching circuits 749 and 750 have the same function as that of the switching circuit 742 of FIG. 4.

A reference signal selection control (REF SEL CONT) circuit 743b having the same function as that of the reference signal selection control circuit 743 of FIG. 4 generates a selection control signal 743c in responsive to the synchronizing signal 74c. This selection control signal 743c is applied to the switching circuits 749 and 750 which then selectively output the signals applied from the decoder 748.

Figure 6:
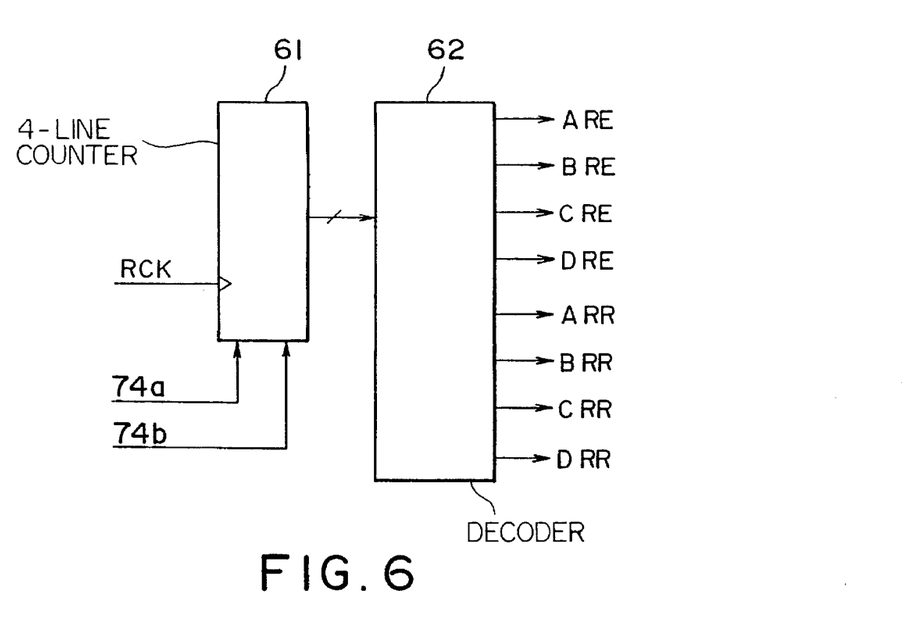
FIG. 6 is a block diagram of an example of a device for executing MEMORY JUMP.

The output signal of the switching circuit 749 and the write enable signal DRE for the memory 5 from the decoder 62 of FIG. 6 are applied to an AND gate 751. The output signal of the AND gate 751 and the output signal of the decoder 748 at its terminal d0 are applied to a flip flop (FF) 753 which generates a window signal 753a (which will be describe later). The window signal 753a and the write enable signal AWR for the memory 2 are applied to an AND gate 755 which generates the MEMORY JUMP control signal 74a.

Furthermore, the output signal of the switching circuit 750 and the write enable signal ARE for the memory 2 from the decoder 62 are applied to an AND gate 752. The output signal of the AND gate 752 and the output signal of the decoder 748 at its terminal d0 are applied to a flip flop (FF) 754 which generates a window signal 754a (which will be describe later). The window signal 754a and the write enable signal AWR for the memory 2 are applied to an AND gate 756 which generates the MEMORY JUMP control signal 74b.

This operation will be explained more detail with reference to FIG. 10. FIGS. 10(a) and 10(b) show the read enable signal ARE and the read reset signal ARR for the memory 2, respectively. FIG. 10(c) shows the window signal 753a which becomes LOW level synchronizing with the leading edge of the signals ARE and ARR and becomes HIGH level during a specific period of time before the trailing edges of the signals ARE and ARR. And FIG. 10(d) shows the window signal 754a which becomes HIGH level synchronizing with the leading edge of the signals ARE and ARR. The window signal 754a remains unchanged in its HIGH level during a specific period of time.

If the write reset signal AWR for the memory 2 exists as shown in FIG.. 10(e) while the window signals 753a and 754a are being generated, there is a strong possibility that the write timing for the memory 2 will catch up with and get ahead the read timing for the same memory. In this case, the MEMORY JUMP control signal 74a is generated by the MEMORY JUMP control circuit 7 of FIG. 2. Therefore, the generation of the MEMORY JUMP control signals 74a and 74b depends on a period of time in which the HIGH level status of the window signals 753a and 754a remains unchanged.

It is a matter of course that the MEMORY JUMP circuit 7 shown in FIG. 2 can be included in the memory control circuit 6.

When MEMORY JUMP is executed, the number of horizontal scanning lines increases or decreases as described before and thus this variation of the horizontal scanning lines causes the phase difference of the vertical synchronizing signal included in the reproduced video signal 8a generated by the digital-to-analog converter 8 and that generated by the synchronizing signal substituting circuit 11 of FIG. 2. The number of horizontal scanning lines with respect to the synchronizing signal 10a generated by the synchronizing signal generating circuit 10 of FIG. 2 is forced to increase or decrease in order to avoid the phase difference. This operation of the synchronizing signal generating circuit 10 will be explained with reference to FIGS. 11 to 13.

Figure 11:
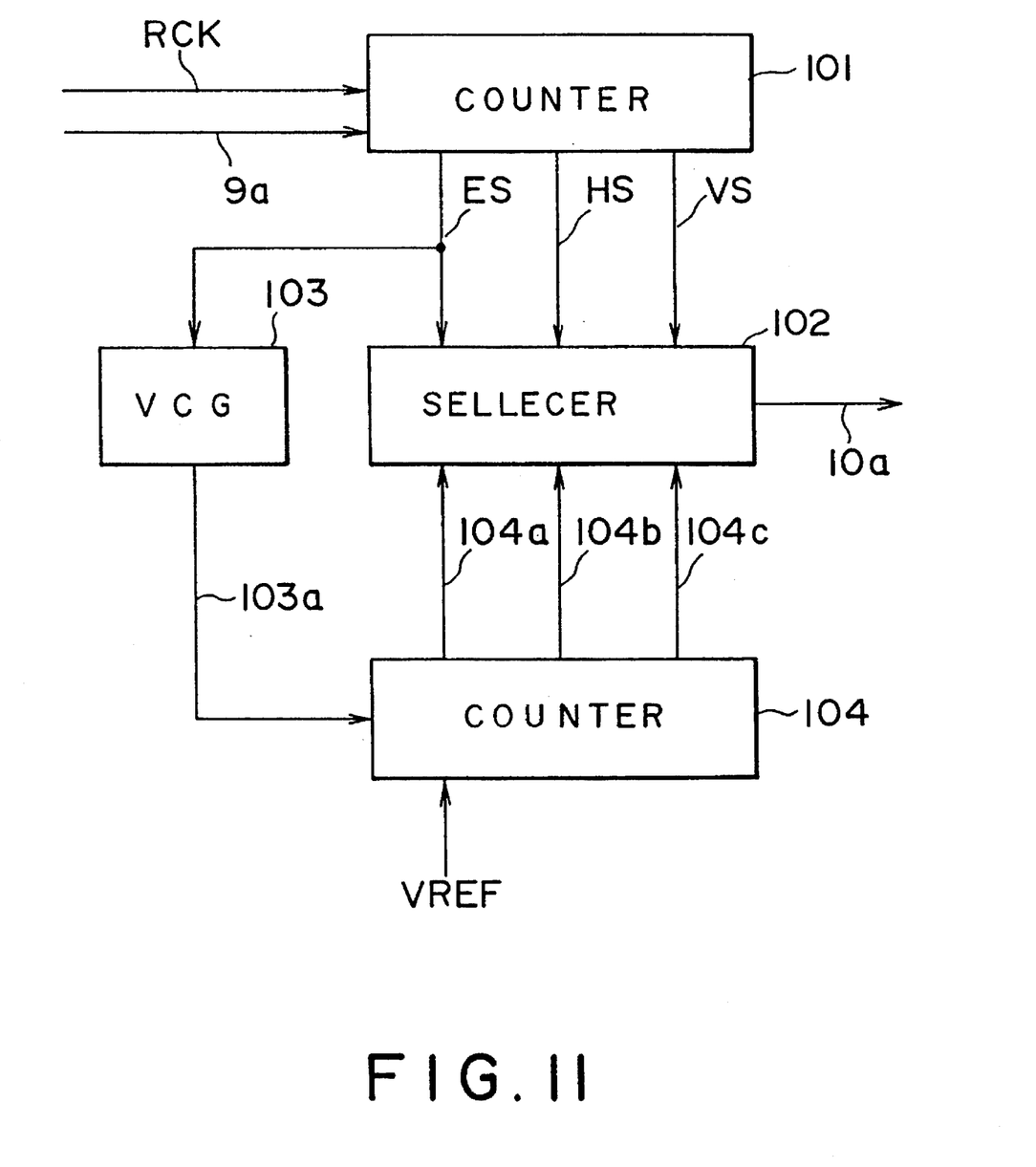
FIG. 11 is a block diagram of a preferred embodiment of the synchronizing signal generating circuit (SSG) 10 shown in FIG. 2.

In FIG. 11, the read clock signal RCK generated by the memory control circuit 6 of FIG. 2 is applied to a counter 101. By means of the signal RCK as a time reference signal, the counter 101 generates an equalizing pulse signal ES, a horizontal synchronizing signal HS and a vertical synchronizing signal VS respectively shown in FIGS. 12(a), 12(b) and 12(c), which are then applied to a selection circuit (SEL) 102.

Also applied to the counter 101 is the reset signal 9a which is generated by the OR gate 9 of FIG. 2, as the result of the logical sum. The read reset signals ARR, BRR, CRR and DRR for the memories 2 to 5, respectively, which are controlled in timing by means of either of the MEMORY JUMP control signals 74a or 74b as described before and generated by the memory control circuit 6 of FIG. 2 are applied to the OR gate 9 which then generates the reset signal 9a.

Figure 12:
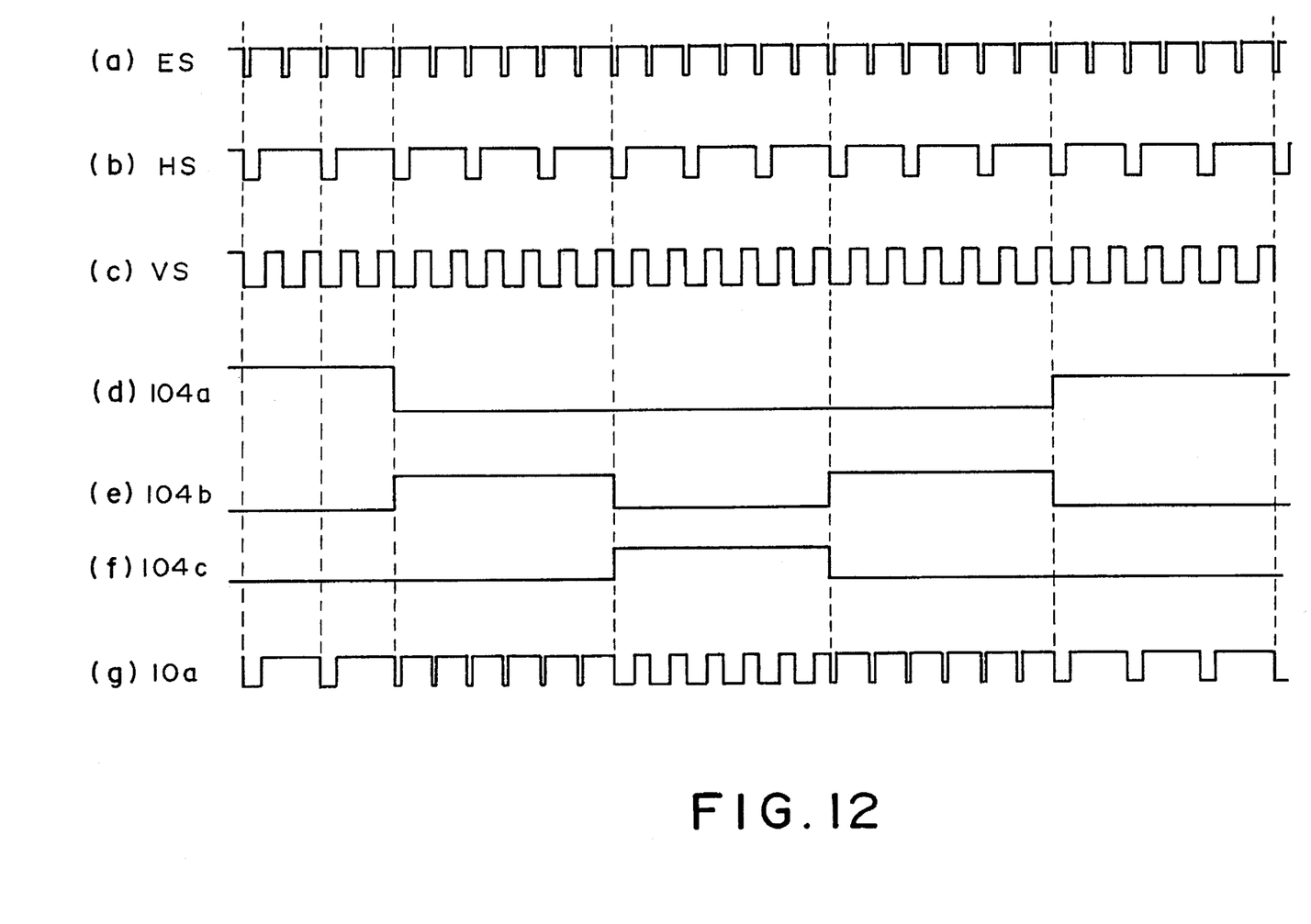

The counter 101 is reset by the reset signal 9a generated as described above, so that the number of pulses of the signals ES, HS and VS shown in FIG. 12 can be increased or decreased in accordance with the increase or decrease in the number of horizontal scanning lines with respect to the digital signal portions read from the memories 2 to 5.

The equalizing pulse signal ES is further applied to a clock signal generating circuit (VCG) 103 which generates a clock signal 103a, whose number of pulses are increased or decreased in accordance with the increase or decrease in horizontal scanning lines described later, is applied to a counter 104.

Also applied to the counter 104 is a vertical reference signal VREF that is generated by a known vertical synchronizing signal separation circuit (not shown). This circuit separates a composite signal from the output reproduced video signal 8a of the digital-to-analog converter 8, further integrates and shapes the composite signal to generate the vertical reference signal VREF.

The counter 104 is reset by the signal VREF to start counting the number of pulses of the clock signal 103a and then generates selection control signals 104a, 104b and 104c as shown in FIGS. 12(d), 12(e) and 12(f). These selection control signals are then applied to the selection circuit 102 which generates the synchronizing signal 10a as shown .in FIG. 12(g) by selectively outputting the equalizing pulse signal ES, the horizontal synchronizing signal HS and the vertical synchronizing signal VS in response to the HIGH level status of the selection signals 104a, 104b and 104c. The synchronizing signal 10a is applied to the synchronizing signal substituting circuit 11 of FIG. 2.

Figure 13:
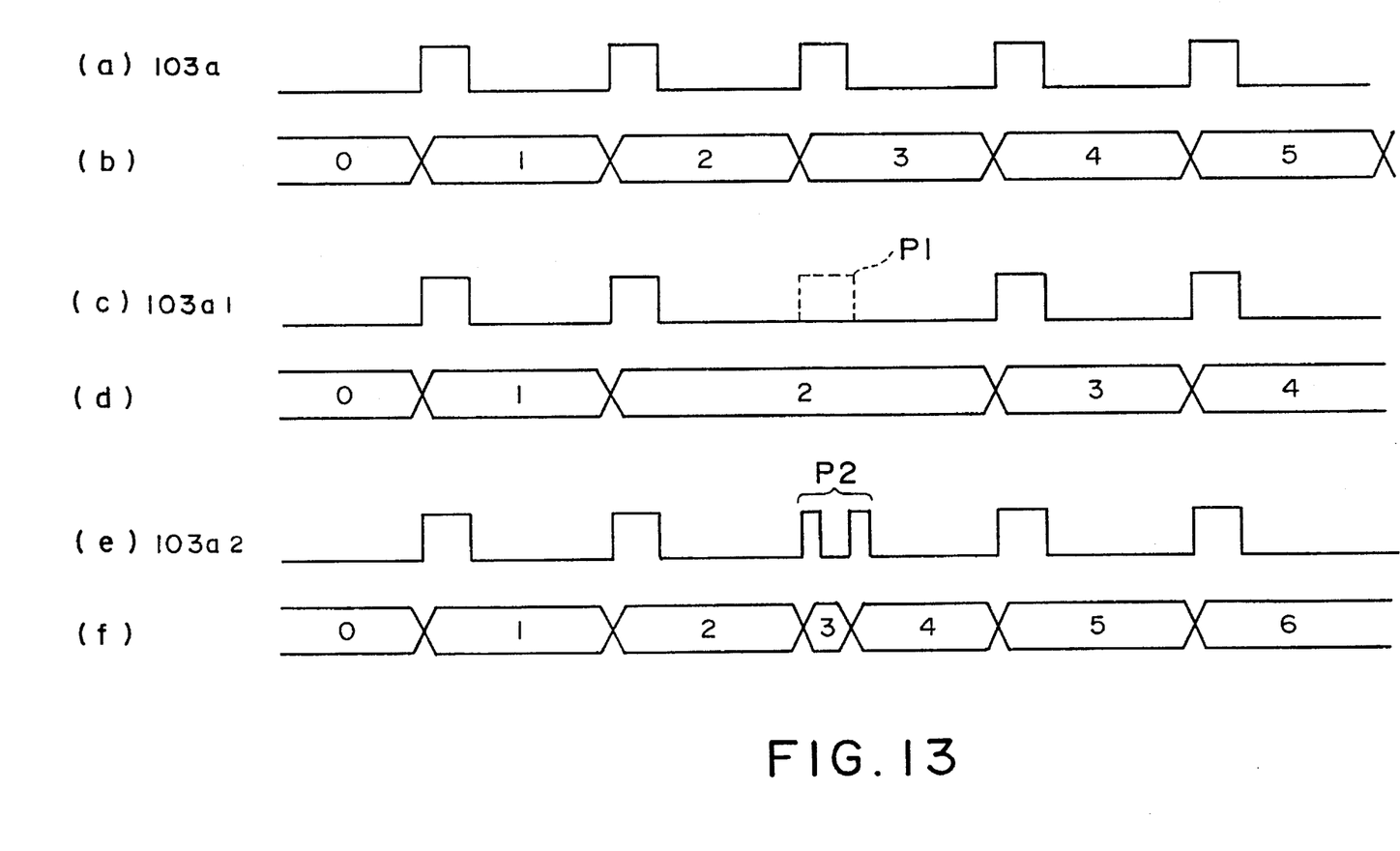

The operation of the synchronizing signal generating circuit 10 of FIG. 11 is further explained in detail with reference to FIG. 13. FIGS. 13(a) and 13(b) show the counted values of the pulses of the clock signal 103a and the output signals of the counter 104, respectively in the case where no MEMORY JUMP is executed. FIGS. 13(c) and (d) show those counted values in the case where MEMORY JUMP is executed to increase the number of horizontal scanning lines. Furthermore, FIGS. 13(e) and (f) show those counted values in the case where MEMORY JUMP is executed to decrease the number of horizontal scanning lines.

When the MEMORY JUMP control signal 74a is generated, a pulse P1 depicted by doted lines is deleted as shown in FIG. 13(c) from the clock signal 103a shown in FIG. 13(a). Thus, the counted value of the counter 104 does not increase.

On the contrary, when the MEMORY JUMP control signal 74b is generated, pulses P2 is added as shown in FIG. 13(e) to the clock signal 103a shown in FIG. 13(a). Thus, the counted value of the counter 104 increases one and becomes four.

The output synchronizing signal 10a of the synchronizing signal generating circuit 10 and the output signal 8a of the digital-to analog converter 8 are applied to the synchronizing signal substituting circuit 11 of FIG. 2.

Figure 14:
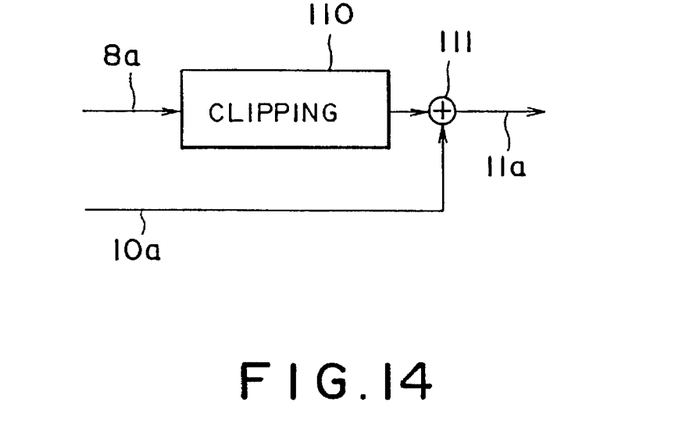
FIG. 14 is a block diagram of a preferred embodiment of the synchronizing signal substitute (SYNC SUB) circuit 11 of FIG. 2.

The synchronizing signal substituting circuit 11 consists of a clipping circuit 110 and an adder 111 as shown in FIG. 14. The output signal 8a is applied to the clipping circuit 110 by which synchronizing signal portions of the signal 8a is extracted therefrom. The output signal of the clipping circuit 110 and the synchronizing signal 10a are applied to the adder 111 which generates the output reproduced video signal 11a. This video signal 11a is obtained by substituting the accurate equalizing pulse signal ES, horizontal synchronizing signal HS and vertical synchronizing signal VS generated by the synchronizing signal generating circuit 10 of FIG. 2 for the synchronizing signal portions of the reproduced video signal 10a which might have time base error or the disturbance of its waveform due to the increase or decrease in horizontal scanning lines.

MEMORY JUMP is executed based on the difference between the write address WA and the read address RA in the embodiments described above. However, it is a matter of course that MEMORY JUMP is executed based on the time difference between the write and read timings.

Furthermore, in the embodiments, MEMORY JUMP is executed within the term Y1 before the vertical synchronizing signal as shown in FIG. 5. It may be executed throughout the terms V and Y in FIG. 5. MEMORY JUMP, in this case, is also executed per horizontal scanning line, so that the digital portions of the reproduced video signal will be sequentially read from the memories 2 to 5.

What is claimed is:

1. An apparatus for correcting a time base error of a video signal, comprising:

a plurality of memories for storing signal portions, each of the signal portions corresponding to a horizontal scanning line of the video signal;

means for sequentially writing the signal portions in the memories with write clock signals synchronized to the video signal at specific write timings and sequentially reading from the memories the signal portions with read clock signals of a constant frequency at specific read timings;

means for counting the write and the read clock signals to generate write and read addresses of the memories;

means for subtracting the read address from the write address to obtain a difference signal indicating a difference between the addresses;

means for generating a reference signal which is located in a time period immediately preceding a latter one of consecutive vertical synchronizing signals, the time period being shorter than the time separating the consecutive vertical synchronizing signals and short enough to prevent disturbance of vertical synchronization;

means for comparing the difference signal with the reference signal to generate a timing changing command when the difference signal is smaller than the reference signal; and read timing changing means, responsive to the timing changing command, for changing at least one of the read timings so that a correlation among the signal portions sequentially read from the memories remains unchanged.

2. An apparatus according to claim 1, wherein the comparing means comprises means for shifting the read timings forward or backward in time in accordance with a polarity of the difference between the read and the write addresses.

3. An apparatus for correcting a time base error of a video signal, comprising:

a plurality of memories for storing signal portions, each of the signal portions corresponding to a horizontal scanning line of the video signal;

means for sequentially writing the signal portions in the memories with write clock signals synchronized to the video signal at specific write timings and sequentially reading from the memories the signal portions with read clock signals of a constant frequency at specific read timings;

means for detecting a difference between the write and the read timings and, when the difference is smaller than a reference value, changing at least one of the read timings so that a correlation among the signal portions sequentially read from the memories remains unchanged;

means for OR'ing the changed read timings with each other to generate an OR signal;

means, responsive to the OR signal, for counting the read clock signals of the constant frequency, thus to generate an equalizing pulse signal, a vertical synchronizing signal and a horizontal synchronizing signal, each having a constant frequency;

means, responsive to the OR signal, the equalizing pulse signal and the vertical and the horizontal synchronizing signals, for selectively outputting the equalizing pulse signal and the vertical and the horizontal synchronizing signals in accordance with the changed read timings and composing the output signals with each other, thus to generate a composite synchronizing signal; and means for substituting the composite synchronizing signal for a synchronizing signal included in the signal portions read from the memories at the changed read timings.

* * * * *